United States Patent Office 3,387,040
Patented June 4, 1968

3,387,040
BROMINATED DIPHENYL SULFIDES
Zvi Enrico Jolles, St. Albans, England, assignor to Berk Limited
No Drawing. Filed Sept. 22, 1964, Ser. No. 398,428
Claims priority, application Great Britain, Sept. 23, 1963, 37,288/63
5 Claims. (Cl. 260—609)

ABSTRACT OF THE DISCLOSURE

Halogenated diphenylsulphides including tetrabromodiphenylsulphide, hexabromo-diphenylsulphide, tetrabromo-dichloro-diphenylsulphide and dibromo-dichloro-diphenylsulphide and polymer compositions containing said compounds and having fire retardant properties imparted thereby.

This invention is concerned with polymer compositions having fire retardant properties and with certain novel compounds which can be used as fire retardant agents for incorporation in polymer compositions.

According to the present invention we provide, as new compounds, tetrabromo-diphenylsulphide, hexabromo-diphenylsulphide and tetrabromo-dichloro-diphenylsulphide. These compounds are preferably, but not essentially, symmetrical in that equal numbers of halogen substituents are present in the two benzene nuclei. The symmetrical form of these compounds and of another novel compound according to tthe invention, dibromo-dichloro-diphenylsulphide, may be represented by the formula

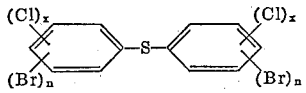

where $x$ is 0 or 1, and $n$ is 2 or 3 when $x$ is 0, and is 1 or 2 when $x$ is 1.

Preferred compounds within this general formula are those in which the halogen substituents are located in the ortho and/or para positions of the phenyl ring relative to the sulphide substituent, that is in the 2,2',4,4'-positions in the case of a tetra-substituted diphenylsulphide and in the 2,2',4,4',6,6'-positions in the case of a hexa-substituted compound.

The novel brominated diphenylsulphides can be prepared by the nuclear bromination of diphenylsulphide in order to introduce 4 or 6 bromine substituents into the starting material. Such nuclear bromination is preferably carried out in an inert solvent, such as carbon tetrachloride, and in the presence of a nuclear bromination catalyst, such as iron powder, with a small molar excess of bromine at an elevated temperature. Alternatively these brominated compounds can be prepared by the procedure known as chloro-bromination in which a small molar excess of bromine is used in the presence of sufficient chlorine to oxidise the hydrogen bromine formed by bromination to bromine, the reaction mixture always containing an excess of bromine over chlorine. Chlorobromination is suitably effected at temperatures of from 10° C. to 160° C. and no catalyst is required.

The novel bromochlorinated diphenylsulphides mentioned above can be prepared by a method generally similar to the first method described for nuclear bromination, except that a mixture of bromine and chlorine should, of course, be used together with a nuclear halogenation catalyst, such as iron powder.

The halogenated diphenylsulphides described above are effective fire retardant agents for a wide variety of synthetic polymers including, for example, polyolefins, such as polyethylene (both low and high density) and polypropylene; polyvinyl compounds, such as polystyrene, polyvinyl acetate and polyvinyl chloride; polyesters, such as polyethylene terephthalate; polyamides, such as nylon; polyurethanes (both flexible and rigid); epoxy resins; polyvinylidene compounds and polymers of allyl compounds. The halogenated diphenylsulphides may be incorporated in the polymer compositions in any suitable way and the method employed will normally depend upon the particular polymer treated. Thus with some polymers, such as polyolefins and polyvinyl compounds, it will normally be preferred to incorporate the fire retardant agent in an already formed polymer together with any other additives, such as stabilisers, plasticisers and antistatic agents, while with other polymers, such as polyurethanes, it will normally be preferred to incorporate the fire retardant agent during synthesis of the polymer, that is by including it in the reaction mixture.

The amount of halogenated diphenylsulphide required to impart adequate fire retardant properties will also depend upon the nature of the particular polymer; suitable proportions are generally below 10% based on the weight of the polymer and in many cases from 1 to 5% by weight is satisfactory. The halogenated diphenylsulphides may, if desired, be used in association with other fire retardant agents and it is particularly advantageous to use them together with antimony trioxide as the latter, while imparting only slight fire retardant properties when used in small proportions (i.e., less than about 5%) by itself, considerably increases the effectiveness of the halogenated diphenylsulphides, enabling a smaller proportion of the latter to be used.

In order that the invention may be more fully understood, the following examples are given by way of illustration only.

EXAMPLE 1

Reaction was carried out in a 1 litre reactor mounted in a heating mantle and equipped with a mechanical stirrer, a condenser, the upper end of which was closed by a tube leading to a hydrobromic acid trap, a thermometer and a top-funnel. The top-funnel initially contained 300 g. (1.87 mol) bromine; 5 ml. of this bromine and 1.5 g. iron powder were introduced into the reactor. After 5 minutes, 225 ml. of carbon tetrachloride was added to the mixture and then 83.8 g. (0.45 mol) of diphenyl sulphide. The stirrer was started and the remainder of the bromine added slowly from the top funnel over a period of 65 minutes. When all the bromine had been added, the mixture was heated to 45° C. and maintained at this temperature for 2 hours when no more hydrobromic acid was evolved. The mixture was washed with two portions of dilute hydrochloric acid (1:1), and the carbon tetrachloride stripped off. The crude black viscous oil obtained (234 g.) was dissolved in ether (ca. 100 ml.) and treated with charcoal, filtered and evaporated to give an oil which rapidly gave tetrabromo-diphenylsulphide as a pale yellow crystalline solid (203 g.: 89.7% of theory) M.P. 71°–73° C.

Found: Br, 7.94 milliequivalents/g. (63.5%). Calculated (for $C_{12}H_6SBr_4$): Br, 7.97 millequivalents/g. (63.8%).

EXAMPLE 2

The apparatus used was similar to that described in Example 1 except that the reactor had a capacity of 700 ml. The top-funnel initially contained 198 g. (1.24 mol) of bromine and 10 ml. of this bromine and 1 g. of iron powder were introduced into the reactor. After 5 minutes, 100 ml. of carbon tetrachloride and 37.2 g. (0.2 mol) of diphenyl sulphide were added and the stirrer started. The remainder of the bromine was added from the top-funnel over a period of 135 minutes. When all the bromine had been added, heat was applied. The mixture was stirred and heated at 50° C., after 1 hour the mixture solidified and a further 125 ml. of carbon tetrachloride was added. After a further 40 minutes no more hydrobromic acid was evolved. After cooling to room temperature, the solid was filtered off and washed with 2×100 ml. of dilute hydrochloric acid (1:1) and then with water until free from acid. After drying at 75° C., 83 g. of hexabromo-diphenylsulphide (63% of theory), M.P. 176°–182° C., was obtained. The carbon tetrachloride filtrate was evaporated and the residue washed with ether and dried at 75° C. to give 5.5 g. of solid.

Found: Br, 8.88 milliequivalents/g. (71.04%). Calculated: Br, 9.09 milliequivalents/g. (72.7%) (for $C_{12}H_4SBr_6$).

EXAMPLE 3

To 93 g. (0.05 mole) of diphenylsulphide dissolved in 400 g. of carbon tetrachloride were added 1.5 g. of iron powder. Over a period of 80 minutes, 160 g. of bromine and 70 g. of chlorine were simultaneously introduced with vigorous stirring, followed by a further 71 g. of chlorine. When reaction was complete, the mixture was stirred at room temperature with 71 g. of a 20% by weight solution of sodium bisulphite, the aqueous layer decanted and the organic layer washed first with 110 g. of a 20% by weight solution of sodium carbonate and then with water until neutral to litmus paper. The product was then dried, filtered and after removal of the solvent, the resultant tetrabromo dichloro diphenylsulphide weighed 244 g., corresponding to a yield of 81% based upon the diphenylsulphide used.

Found: Bromine, 52.4%; chlorine, 12.4%. Calculated (for $C_{12}H_4SBr_4Cl_2$): Bromine, 53%; chlorine, 11.8%.

EXAMPLE 4

The additives listed below were mixed, in the proportions stated, with low density polyethylene sold under the trademark "Alkathene" WNG 14 by I.C.I. Ltd. and moulded into sheets measuring 6 x 6 x ⅛ inches. The sheets were then cut into strips measuring 6 x ¾ x ⅛ inches and subjected to fire retardant testing.

The fire retardant test adopted, a modified form of A.S.T.M. D–635–56T Part 9 (1958) for flammability of rigid plastics, was as follows:

Each test strip was marked 1 inch and 4 inches from one end thereof. The test strip was clamped in a support with its longitudinal axis horizontal and its transverse axis inclined at 45° to the horizontal; the test strip was then placed in a fume hood through which a slight draught was allowed to pass to ensure an adequate oxygen supply and removal of combustion products. An ignited standard micro-burner of ⅛ inch diameter with air ports open to produce a blue flame approximately 1 inch high was so placed that the top of the flame contacted the free end of the test strip for 5 seconds. In those tests in which the test strip did not continue to burn after removal of the burner flame, the flame was immediately re-applied to the free end of the test strip for a second period of 5 seconds. After removal of the burner flame it was extinguished and the hood door closed for the remainder of the test.

Those test strips which did not burn to the 1 inch mark within 1 second were classified as "non-burning" ("NB"), whereas those which burnt beyond the 1 inch mark but no further than the 4 inch mark were classified as "self-extinguishing" ("SE"); test strips which burnt beyond the 4 inch mark were classified as "burning." The time of burning was recorded starting from the time the flame reached the 1 inch mark until it was extinguished. The extent of burning between the 1 inch and 4 inch marks was also noted: the extent of burning of test pieces which did not burn up to the 1 inch mark was recorded as "NRIM." All references to "non-burning," and "self-extinguishing," and "burning" are to be construed in accordance with the above classification.

The results obtained were as follows:

| Additive | Percent W./W. | AO, Percent W./W. | Extent of burning, inches | Time of burning, seconds 1st Ignition | Time of burning, seconds 2d Ignition | Rate of burning, in./min. | ASTM Classification |
|---|---|---|---|---|---|---|---|
| TBDPS | 5.5 | 3.3 | NRIM | 14.4 | 138 | | SE |
|  | 10.1 | 6.0 | NRIM | 0 | 1 | | SE/NB |
|  | 9.9 | 0 | 0.4 | 16.0 | | 0.16 | SE |
| HBDPS | 4.9 | 3.0 | NRIM | 2 | 19 | | SE |
|  | 9.1 | 0 | 0.8 | 205 | | 0.17 | SE |

Legend.—TBDPS=Tetrabromodiphenyl sulphide; HBDPS=Hexabromodiphenyl sulphide; AO=Antimony trioxide.

EXAMPLE 5

100 parts of a polyester resin sold under the trademark "Daltolac" 21 by I.C.I. Ltd. 4 parts of water and 1 part of a non-ionic polyoxyethylene condensate surface active agent sold under the trademark "Lissapol" N were thoroughly mixed together. The mixture thus obtained was added to a separately prepared mixture consisting of 120 parts of diisocyanato-methane sold under the trademark "Suprasec" D by I.C.I. Ltd., in which there had been thoroughly dispersed a selected proportion of the fire retardant agent and an amount of antimony trioxide such that the polyurethane product contained 2.5% by weight thereof, the fire retardant agent and the antimony trioxide having been previously ground to pass a 100 mesh B.S. sieve. The whole of the mixture was then stirred vigorously and poured into a suitable mould.

Foaming continued for ten minutes and in a further thirty minutes the foam set. The foam was allowed to cure at room temperature for at least 5 days and was then cut into test pieces 6 inches long and of 1 inch square cross-section for fire retardancy tests.

The fire retardancy tests were carried out as described in Example 3 and the results obtained may be summarised as follows:

(a) Using tetrabromo-diphenyl sulphide as fire retardant agent (i) 0.8%+2.5% antimony trioxide—self-extinguishing.
(ii) 4.4%+2.5% antimony trioxide—non-burning.

(b) Using hexabromo-diphenylsulphide as fire retardant agent (i) 0.7%+2.5% antimony trioxide—self-extinguishing.
(ii) 3.9%+2.5% antimony trioxide—non-burning.

The foregoing summarises the results of many tests of the kind given in full in Example 4, using various proportions of the fire retardant agents and the above concentrations of brominated diphenylsulphide represent the minimum concentrations required to produce a self-extinguishing or a non-burning product, respectively, when using 2.5% of antimony trioxide.

I claim:
1. Halogenated diphenylsulphides of the formula

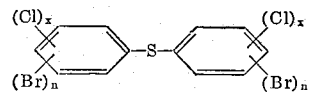

where $x$ is an integer from 0 to 1, and $n$ is an integer from 2 to 3 when $x$ is 0, and is an integer from 1 to 2 when $x$ is 1.

2. Tetrabromo-diphenylsulphide.
3. Hexabromo-diphenylsulphide.

4. Tetrabromo-dichloro-diphenylsulphide.
5. Brominated diphenylsulphides of the formula
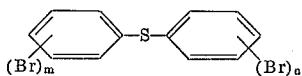
where $m$ and $n$ are integers from 1 to 3, the sum of $m$ and $n$ being at least 4.
References Cited
UNITED STATES PATENTS
2,607,802   8/1952   Britton et al. ........ 260—544
CHARLES B. PARKER, *Primary Examiner.*
D. R. PHILLIPS, *Assistant Examiner.*